No. 677,405. Patented July 2, 1901.
T. R. & F. E. FERRIS.
S. E. FERRIS, Administratrix of T. R. FERRIS, Dec'd.
COMBINATION HOE AND WEEDER.
(Application filed Oct. 1, 1900.)

(No Model.)

WITNESSES.  INVENTORS.
Sarah E. Ferris
Administratrix of the Estate of Thomas R. Ferris
Frank E. Ferris
By Newell S. Wright their Attorney

UNITED STATES PATENT OFFICE.

SARAH E. FERRIS, OF MONROE, ADMINISTRATRIX OF THOMAS R. FERRIS, DECEASED, AND FRANK E. FERRIS, OF DETROIT, MICHIGAN; SAID SARAH E. FERRIS, ADMINISTRATRIX, ASSIGNOR TO SAID FRANK E. FERRIS.

COMBINATION HOE AND WEEDER.

SPECIFICATION forming part of Letters Patent No. 677,405, dated July 2, 1901.

Application filed October 1, 1900. Serial No. 31,608. (No model.)

*To all whom it may concern:*

Be it known that we, SARAH E. FERRIS, a citizen of the United States, residing at Monroe, county of Monroe, State of Michigan, administratrix of the estate of THOMAS R. FERRIS, late a citizen of the United States, and a resident of Monroe, county of Monroe, in the State of Michigan, deceased, and FRANK E. FERRIS, a citizen of the United States, residing at Detroit, county of Wayne, and State of Michigan, and who jointly with the said THOMAS R. FERRIS did invent a Combination Hoe and Weeder, declare the following to be a full, clear, and exact description of the invention, such as will enable others skilled in the art to which it appertains to make and use the same, reference being had to the accompanying drawings, which form a part of this specification.

This invention has for its object certain new and useful improvements in a combination hoe and weeder; and it consists of the construction hereinafter described and claimed, and illustrated in the accompanying drawings, in which—

Figure 1:
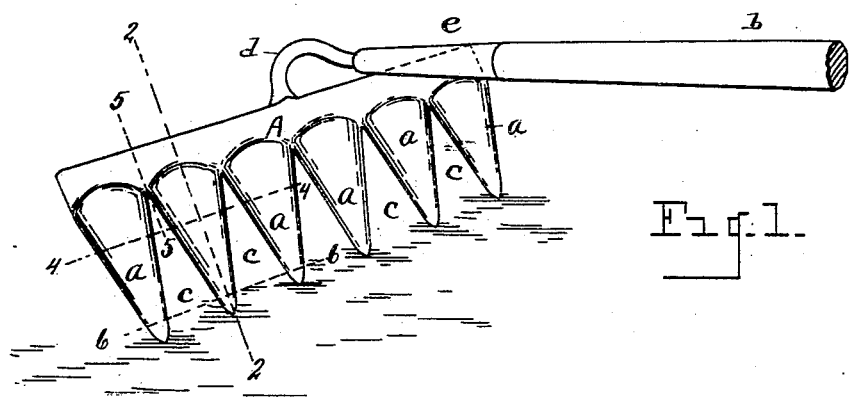
Figures 4, 6:
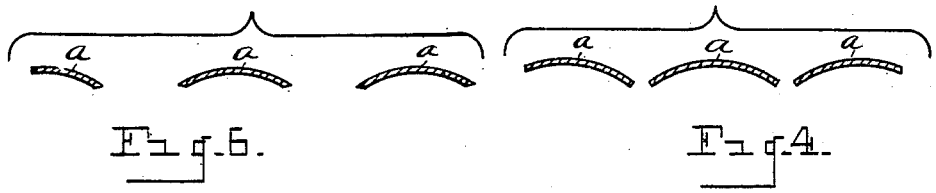
Figures 2, 3, 5:
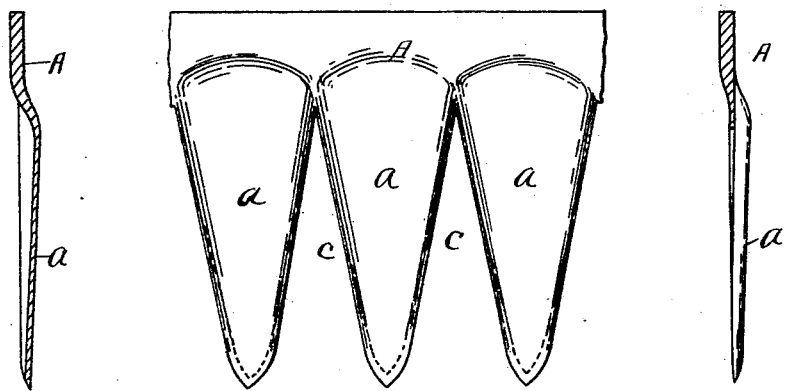

Figure 1 is a view in perspective illustrating the invention. Fig. 2 is a view in section on the line 2 2, Fig. 1. Fig. 3 is a partial view in front elevation. Fig. 4 is a view in cross-section on the line 4 4, Fig. 1. Fig. 5 is a view in section on the line 5 5, Fig. 1. Fig. 6 is a view in section on the line 6 6, Fig. 1.

The invention is designed to provide a combination hoe and weeder adapted to pull the weeds instead of cutting them off, and thereby leaving the roots in the ground to grow, while at the same time the teeth of the hoe will effectually loosen and mellow the soil more effectually than the ordinary hoe.

The invention is carried out as follows:

In the drawings, *a* represents a series of teeth curved in cross-section, the teeth being convexed on the front surface or toward the handle *b*, as indicated more particularly in Figs. 4 and 6. The teeth are integrally united with a rib or blade A at their upper ends, said rib or blade being thickened or made heavier, as indicated more particularly in Figs. 2 and 5, to give proper stiffness to the implement. The rib or blade is comparatively narrow in cross-section relative to the length of the teeth, the teeth projecting upward toward the rib or blade quite a little above the longitudinal center of the implement. Between the teeth are corresponding recesses, essentially of an inverted-V shape, (indicated at *c*,) said recesses preferably coming to a sharp point at their upper ends adjacent to said blade or rib. Adjacent to the sharp points of said recesses the teeth are not sharpened, but left blunt, so as not to cut the weeds, but rather to engage and pull them out of the soil. The lower ends of the teeth are curved, as shown. The shank *d* is formed integral with the rib or blade and is attached to the handle by a ferrule *e* in the customary manner. As indicated more particularly in Fig. 2, the front face of the teeth—*i. e.*, the face toward the handle—is curved longitudinally at the upper end of the teeth, adjacent to their union with the rib or blade, as indicated more particularly in Figs. 2 and 5.

It will be evident that since the teeth are crowned in cross-section they will shed the dirt better than if they were made flat, the earth being turned to fall behind the teeth, while the teeth loosen the soil more effectually than is the case with the ordinary hoe, where a slice of earth is cut in the operation of the hoe. The weeds are forced up into the upper ends of the recesses *c*, made narrow and pointed, as above described, to engage and pull the weeds out of the mellowed soil, while the lower ends of the teeth being so formed free the soil about the roots of the weeds. The edges of the teeth adjacent to the top of the recess are left square, while the edges toward the lower ends of the teeth are beveled to a cutting edge.

What is claimed as the invention is—

1. A combination hoe and weeder formed with a series of teeth integrally united with a transverse thickened stiffening-blade at their upper ends, the spaces between the teeth made pointed at their upper ends, said teeth crowned in cross-section and having blunt edges toward the upper ends thereof, said blade made narrower than the length of the teeth, substantially as described.

2. A combination hoe and weeder formed with a series of teeth integrally united with a transverse stiffened blade at their upper ends, all of said teeth crowned in cross-section on the front face thereof, the space between the teeth made pointed at their upper ends, said blade made thicker in cross-section than the teeth, the teeth being curved longitudinally on the front face thereof adjacent to the base of the blade, and said blade made narrower than the length of the teeth, substantially as described.

3. A combination hoe and weeder formed with a series of teeth integrally united with a transverse stiffened blade at their upper ends, said teeth crowned in cross-section, the space between the teeth made pointed at their upper ends, said blade made thicker in cross-section than the teeth, the teeth being curved longitudinally on the front face thereof adjacent to the blade, the outer edges of the outer teeth being inclined inward toward their lower extremities, and having outer cutting edges, substantially as described.

In testimony whereof we sign this specification in the presence of two witnesses.

SARAH E. FERRIS,
*Administratrix of estate of Thomas R. Ferris.*
FRANK E. FERRIS.

Witnesses:
N. S. WRIGHT,
M. HICKEY.